United States Patent
Motomura et al.

(12) 
(10) Patent No.: US 6,397,011 B1
(45) Date of Patent: May 28, 2002

(54) CAMERA WITH AUTOMATIC STOP CHANGE DEVICE

(75) Inventors: Katsumi Motomura, Saitama; Hirofumi Katsura, Kanagawa, both of (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 7 days.

(21) Appl. No.: 09/696,245

(22) Filed: Oct. 26, 2000

(30) Foreign Application Priority Data

Nov. 1, 1999 (JP) .......................................... 11-311349

(51) Int. Cl.[7] .......................... G03B 7/085; G03B 15/05
(52) U.S. Cl. ........................ 396/170; 396/257; 396/267; 396/276
(58) Field of Search ................................ 396/170, 257, 396/267, 276, 274

(56) References Cited

U.S. PATENT DOCUMENTS

| | | | | |
|---|---|---|---|---|
| 4,478,502 A | * | 10/1984 | Nakai | 396/170 |
| 5,381,200 A | | 1/1995 | Takagai | 396/493 |
| 2001/0002949 A1 | * | 6/2001 | Hata | 396/257 |
| 2001/0048812 A1 | * | 12/2001 | Kameyama et al. | 296/257 X |

* cited by examiner

Primary Examiner—W. B. Perkey
(74) Attorney, Agent, or Firm—Young & Thompson (57) ABSTRACT

A first light guide and a second light guide are attached to a flash charge switch. Each light guide is arranged in a direction where the flash charge switch is slid. If the flash charge switch is in an OFF position, the first light guide transmits light from a photometric window to a photo sensor. If the flash charge switch is in an ON position, the second light guide transmits the light through the photometric window to the photo sensor. As the first light guide has a short distance from an incident end to the photometric window, the incident end has a large incident angle and brighter light is transmitted to the photosensor. As the second light guide has a long distance from the incident end to the photometric window, weak light is transmitted to the photo sensor. When an output signal of the photo sensor is above a predetermined value, a solenoid is activated to set a stop plate on a photographic light path. The stop plate is formed with a small stop aperture. If the stop plate is retired from the photographic light path, a normal stop aperture having a larger size than that of the small stop aperture is used. A flash photography and a daylight photography are different from each other in type of the light guides being used, thus a threshold of subject brightness as a reference point for setting the small stop aperture depends upon that.

10 Claims, 8 Drawing Sheets

CAMERA WITH AUTOMATIC STOP CHANGE DEVICE

BACKGROUND OF THE INVENTION

1. Field of the Invention

The present invention relates to a camera that switches aperture sizes automatically according to subject brightness, more particularly to a camera that changes threshold levels of the subject brightness for changing the aperture size between a flash photography and a daylight photography.

2. Background Arts

As is well known, there is such a camera of a simple exposure mechanism as a lens-fitted photo film unit previously loaded with a photo film. Since the lens-fitted photo film unit is a kind of single-use camera, it is desirable to simplify its structure and lower cost for manufacturing. And a lens-fitted photo film unit where a flash device is built in is also well known. When a flash charge switch thereof is turned on, the flash device emits light synchronized with a shutter so as to perform the flash photography.

In the recent years, at users' demand for higher image quality, research and development have been made to produce a lens-fitted photo film unit that is provided with an automatic stop change device for changing stop apertures automatically in accordance with subject brightness. One case of the automatic stop change device is constituted of a stop plate or blade provided with a small opening (hereinafter referred to as "small stop aperture") and a stop control circuit for inserting the stop plate in a photographic light path. If the subject brightness is below a threshold, the stop plate is retired from the photographic light path, so a frame of a photo filmstrip is exposed through a fixed stop aperture. The fixed stop aperture is formed through a shutter cover in an example, and a size thereof is larger than that of the small stop aperture. Although such a fixed aperture-stop is generally called an open aperture-stop, yet the fixed stop aperture is referred to as "normal stop apertures" in the present specification. When the subject brightness is above the threshold, the stop control circuit is operated when the shutter release button is depressed halfway, to set the stop plate on the photographic light path. A shutter mechanism is operated when the shutter release button is fully depressed, so that light through the small stop aperture enters the photo filmstrip. As the aperture sizes are automatically switched correspondingly to the subject brightness in the automatic stop change device, an available range of the subject brightness can be enlarged.

However, in the automatic stop change device as mentioned above, the threshold level for switching the stop apertures is fixedly determined, thus there are a first subject brightness range where the normal stop aperture is selected, and a second subject brightness range where the small stop aperture is selected. However, in a daylight photography where the flash device is unused, it is possible to take photographs at permissible exposure conditions with the small stop aperture even while the subject brightness is in the first subject brightness range, if it is on higher brightness side of the first range. Yet within the first subject brightness range, as the normal stop aperture is used, a depth of field becomes smaller. That can result an insufficient focusing at long distance photography. Also in a flash photography where the flash device is used, it is possible to take photographs at permissible exposure conditions with the normal stop aperture even while the subject brightness is in the second subject brightness range, if it is on lower brightness side of the second range. Yet within the second brightness range, as the small stop aperture is used, the background is under-exposure. In this way, the conventional automatic stop change device cannot control exposure suitably for the subject brightness around the threshold level.

SUMMARY OF THE INVENTION

In view of the foregoing, an object of the present invention is to provide a camera that makes it possible to change the aperture size suitably for photographic condition.

Another object of the present invention is to provide a camera with a simple structure for changing the aperture size.

A further object of the present invention is to provide a camera that makes it possible to increase exposure amount of a background in a flash photography, and have a greater depth of field in a daylight photography within a predetermined subject brightness range.

The above and other objects can be accomplished by changing amount of light entering a photo sensor in response to operation of a flash charge switch, thereby to change threshold levels of the subject brightness for changing the aperture size. A signal from the photo sensor is transmitted to a comparison circuit. In the comparison circuit, if output of a photometric element is above a predetermined value, a stop plate inserts a photographic light path to take photography by use of a small stop aperture.

In the embodiments of the present invention, a first light guide and a second light guide are provided and selectively used for the purpose of transmitting light from a photometric window to the photo sensor. The first light guide is selected for the daylight photography (in which a flash device is unused). As the first light guide has a shorter distance from an incident end to the photometric window, a larger amount of light enters the incident end. The second light guide is selected for the flash photography. As the second light guide has a longer distance from an incident end to the photometric window, a smaller amount of light enters the incident end. In the first light guide, if the subject brightness is above S1, the output from the photometric element becomes above the predetermined value, and the stop plate inserts the photographic light path. As the stop plate has the small stop aperture, the exposure amount is restricted. In the second light guide,if the subject brightness is above S2 (S1<S2), the output from the photometric element becomes above the predetermined value and the stop plate inserts the photographic light path. Therefore, the threshold level of the subject brightness becomes S1 in the daylight photography, and the threshold level of the subject brightness becomes S2 in the flash photography.

Either the first light guide or the second light guide is selected in response to the flash charge switch. And two light guides that are different from each other in sectional area of the incident end may be used for the purpose of changing the amount of light inserting the respective incident end.

In the present invention, the threshold of the subject brightness that are reference values for changing the stop apertures are changed by controlling the amount of incident light on the photo sensor in response to the operation of the flash charge switch, so that the stop apertures can be changed by means of a simple structure to the suitable size for the photographic condition around those subject brightness levels where the aperture size is to be changed.

Among all, since there are a plural number of the light guides which are different from each other in the amount of the incident light, and one of the light guides is selected in response to the flash charge switch, to guide the light from the photometric window to the photo sensor, it is easy to change the threshold levels of the subject brightness. Also, if two light guides whose distances from the photometric window to the incident end are respectively different are used, photometric ranges are changed as well as the amount of light. Thereby, it is possible to change the aperture size on the basis of averaged brightness measuring for measuring brightness of a whole field to be taken and center-weighted measuring for measuring the center of the field particularly.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein.

DETAILED DESCRIPTION OF THE EMBODIMENTS

Figure 1:
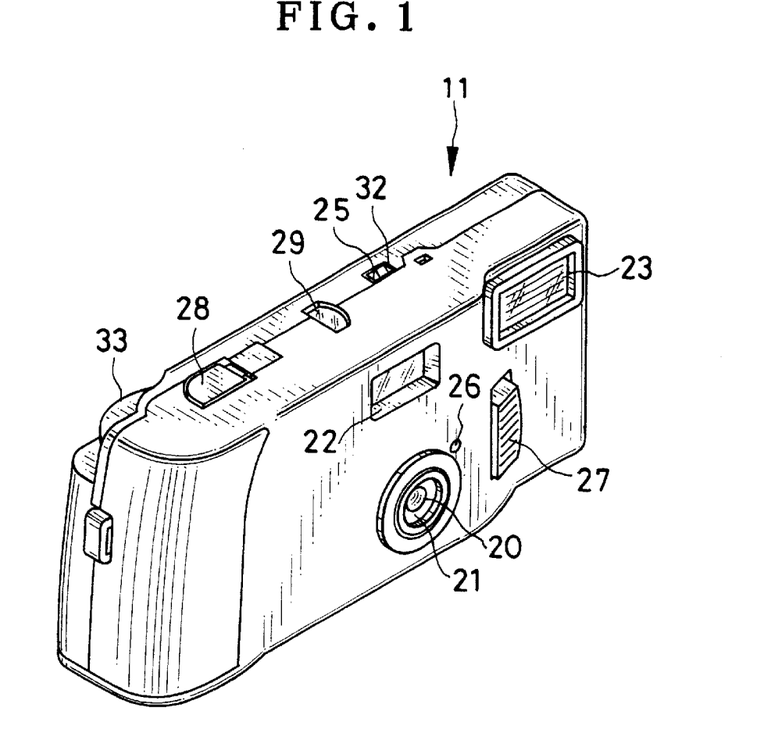
FIG. 1 is a perspective view of a lens-fitted photo film unit according to an embodiment of the present invention.
Figure 2:
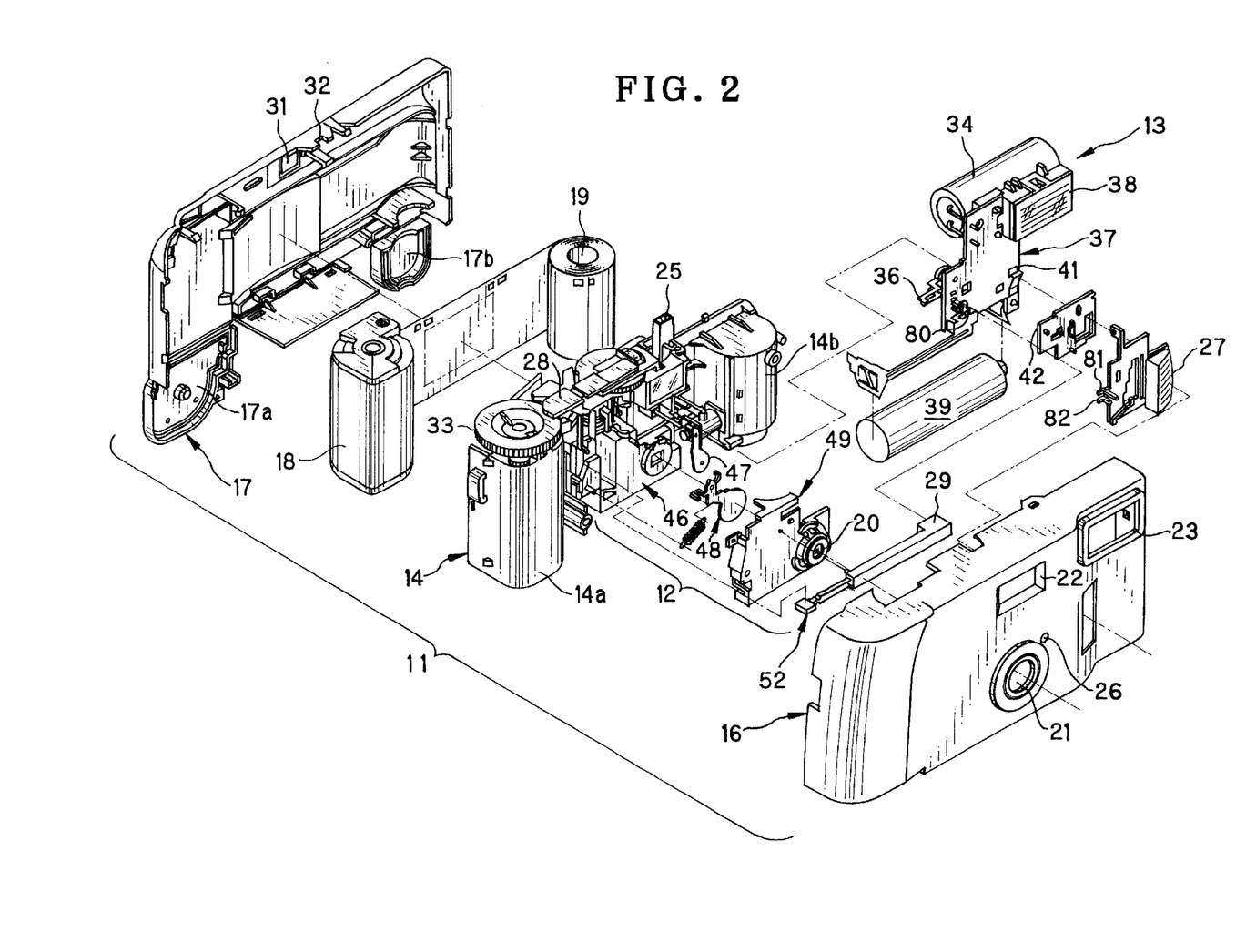
FIG. 2 is an exploded perspective view of the lens-fitted photo film unit illustrated in FIG. 1.

In FIGS. 1 and 2, a lens-fitted photo film unit 11 is constituted of a unit, a cartridge 18, and a roll of an unexposed photo filmstrip 19 withdrawn from the cartridge 18. The unit is further constituted of a main body 14, both a front cover 16 and a rear cover 17 for covering forward and rearward from the main body 14. The center of the main body 14 is provided with an exposure unit 12, and a flash device 13 is placed on one side of the main body 14. And the main body 14 is formed with a cartridge chamber 14a and a film chamber 14b, wherein the cartridge 18 and the photo filmstrip 19 are previously loaded at a manufacturing plant.

An exposure window 21, a finder objective window 22, a flash emitter window 23 and a photometric window 26 are provided through a front face of the front cover 16, and a flash charge switch 27 is attached thereon. A taking lens 20 is placed on the rear of the exposure window 21. A top face of the front cover 16 is formed with a shutter release button 28 and a frame counter window 29. The flash charge switch 27 for starting a charge of the flash device 13 is disposed slidably in a vertical direction.

The rear cover 17 is provided with a finder eyepiece window 31 at the rear, and a charge-up checking window 32 at the top face for fitting an end of a light guide 25 therein. The light guide 25 moves up and down in the charge-up checking window 32. When the flash charge switch 27 is slid to an ON position, the light guide 25 protrudes from the charge-up checking window 32. A light-emitting diode, which is disposed on the end of the light guide 25, lights up while the flash device 13 is charged up. At the sight of the lightning through the light guide 25, a photographer can recognize that the flash device 13 is charged up. Additionally, bottom lids 17a and 17b are integrated with the rear cover 17 for covering both bottom openings of the cartridge chamber 14a and the film chamber 14b in a light-tight manner. The bottom lid 17a is opened for removing the cartridge 18 where the exposed photo filmstrip 19 is wound.

A winding wheel 33 is mounted on a top of the cartridge chamber 14a, and a winding shaft integrally formed with a bottom of the winding wheel 33 is engaged with a spool of the cartridge 18. As the winding wheel 33 is subjected to a rotational movement by photography, the exposed photo filmstrip 19 is wound into the cartridge 18 by a frame. In response to winding operation of one frame of the photo filmstrip 19, a shutter mechanism in the exposure unit 12 is charged for the following photography, and then the rotational movement of the winding wheel 33 is locked by a lock lever in the exposure unit 12 at the end of advancing one frame of the photo filmstrip 19.

The flash device 13 is constituted of a circuit board 37, a light-emitting unit 38 and a battery 39. The circuit board 37 has printed a circuit pattern, and such flash circuit elements as a main capacitor 34, a synchronous switch 36 and a booster coil that are attached on a circuit pattern. The light-emitting unit 38 is constituted of a flash discharge tube and a light reflector, and mounted on the circuit board 37. A front face of the circuit board 37 is provided with a charge switch contact projection 41 and a photo sensor 80. And a support plate 42 for supporting the flash charge switch 27 is put in front of the charge switch contact projection 41. Additionally, the charge switch contact projection 41 is turned on and off by sliding the flash charge switch 27.

For the photo sensor 80, it is possible to use such elements as cadmium sulfide (CdS), cadmium selenide (CdSe) or a photodiode that change resistance values thereof corresponding to amount of received light, or a photoelectric cell that causes electromotive force corresponding to the amount of received light.

A darkroom base frame 46 being cylinder-shaped in a quadrilateral manner and protruding forwards is used for a base of the exposure unit 12 and provided with the shutter mechanism, a film winding mechanism, a film counter disk and the like. Besides, the exposure unit 12 secures an objective lens and an eyepiece as components of a finder optical system. An exposure frame is formed on a rear face of the darkroom base frame 46, and forms an exposure area by a frame in front of the photo filmstrip 19 advanced to a position to be exposed.

Figure 4A:
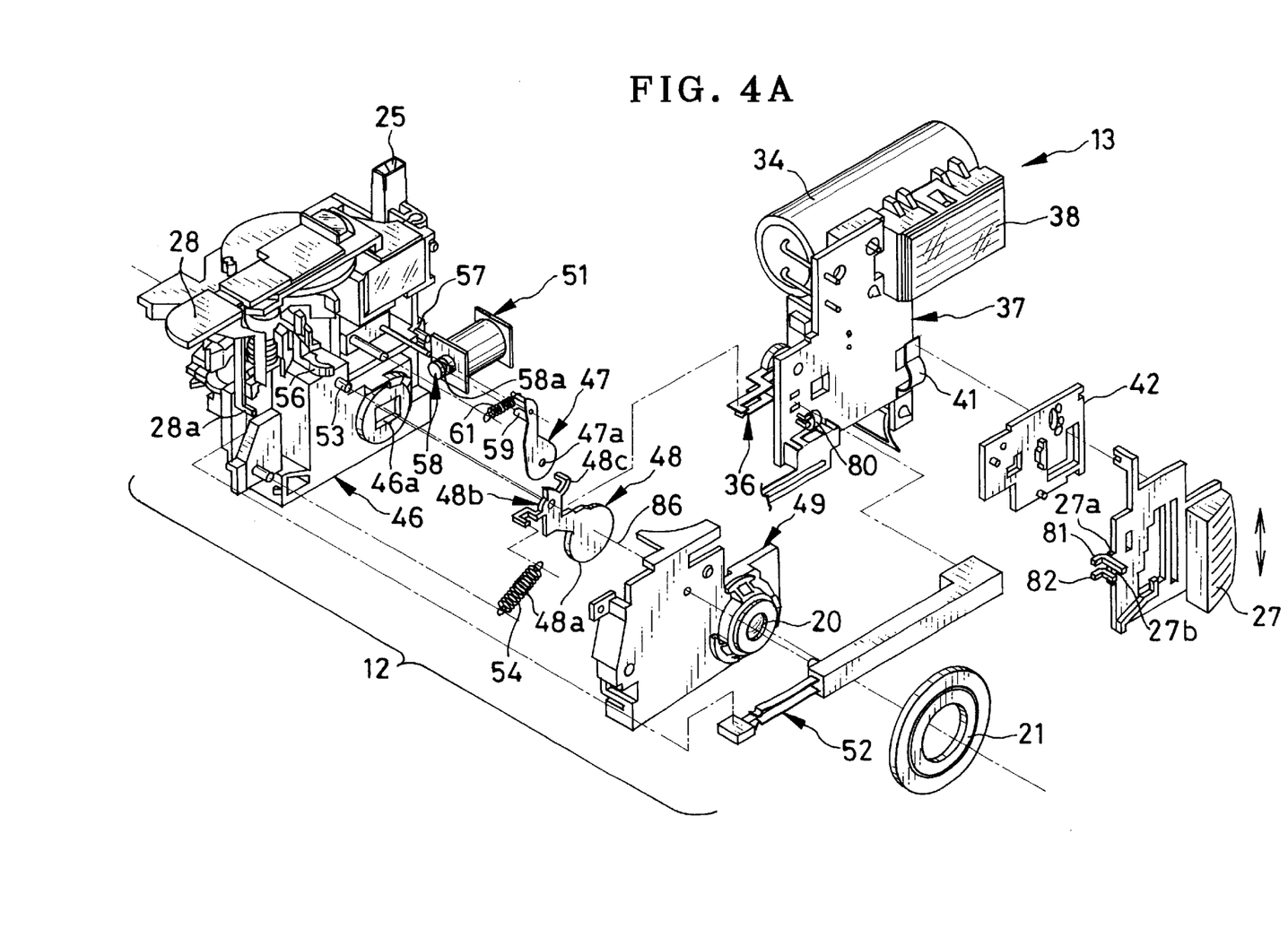
FIG. 4A is an exploded perspective view of an exposure unit.

As shown in FIG. 4A, a front face of the darkroom base frame 46 is formed with a shutter opening 46a, and a stop plate 47, a shutter blade 48 and a shutter cover 49 that covers all the above are placed in front of the shutter opening 46a. A small stop aperture 47a, which is provided through the stop plate 47, has a smaller size than that of a normal stop aperture to reduce the exposure amount on the photo filmstrip 19. A solenoid 51 as a driving source is placed on one side of the darkroom base frame 46 for driving the stop plate 47. Instead of using the solenoid 51, it is possible to use such a sort of driving sources as a motor.

The shutter cover 49 is provided with the normal stop aperture, as disclosed in U.S. Pat. No. 5,381,200. In front of the normal stop aperture, the taking lens 20 is arranged and pushed from upward by means of a lens holder. And a switch 52 for activating a stop control circuit is arranged on a front face of the shutter cover 49 connectively with the shutter release button 28. The switch 52 is in an ON state by means of a push lever 28a disposed downward from the shutter release button 28.

The shutter blade 48 belongs to the conventional kick type, and is constituted of a blade portion 48a and a fitting portion 48b extended upwards from the blade portion 48a. The fitting portion 48b where a pin 53 disposed in front of the darkroom base frame 46. The blade rotates around the pin 53 between a closing position of closing the shutter opening 46a and an opening position of opening the shutter opening 46a. A first spring 54 is bridged between the fitting portion 48b and the darkroom base frame 46, and the shutter blade 48 is biased in the closing direction by the first spring 54. When the shutter release button 28 is depressed, the shutter mechanism is operated and a kick lever 56 kicks a top portion of the fitting portion 48b. Thereby, the blade portion 48a rotates to open and close the shutter opening 46a. It is noted that time for opening the shutter blade 48 is previously fixed at a predetermined value to keep shutter speed constant all the time.

Besides, the fitting portion 48b is provided with a push lever 48c. The push lever 48c is used to force the flash device 13 to emit light as the shutter opening 46a opens and closes, and turns on the synchronous switch 36 when the shutter blade 48 reaches a position where the shutter opening 46a is fully opened after the shutter release button 28 is fully depressed.

A groove 58a is formed around a movable iron core 58 of the solenoid 51, and connected with a pin 59 disposed on the stop plate 47. When the solenoid 51 is activated, the movable iron core 58 is protruded to a predetermined position, so that the stop plate 47 rotates toward a first position. Then, the stop plate 47 is kept in the first position against to a biasing force of a second spring 61 as long as the solenoid 51 is activated. On the first position, the stop plate 47 inserts a photographic light path 86, and the photo filmstrip 19 is exposed by light through the small stop aperture 47a. When the solenoid 51 is turned off, the second spring 61 urges the stop plate 47 to rotate toward a second position, and to contain the movable iron core 58 in the solenoid 51. On the second position, the stop plate 47 is retired from the photographic light path 86, thus the photo filmstrip 19 is exposed by light through the normal stop aperture.

Figure 3:
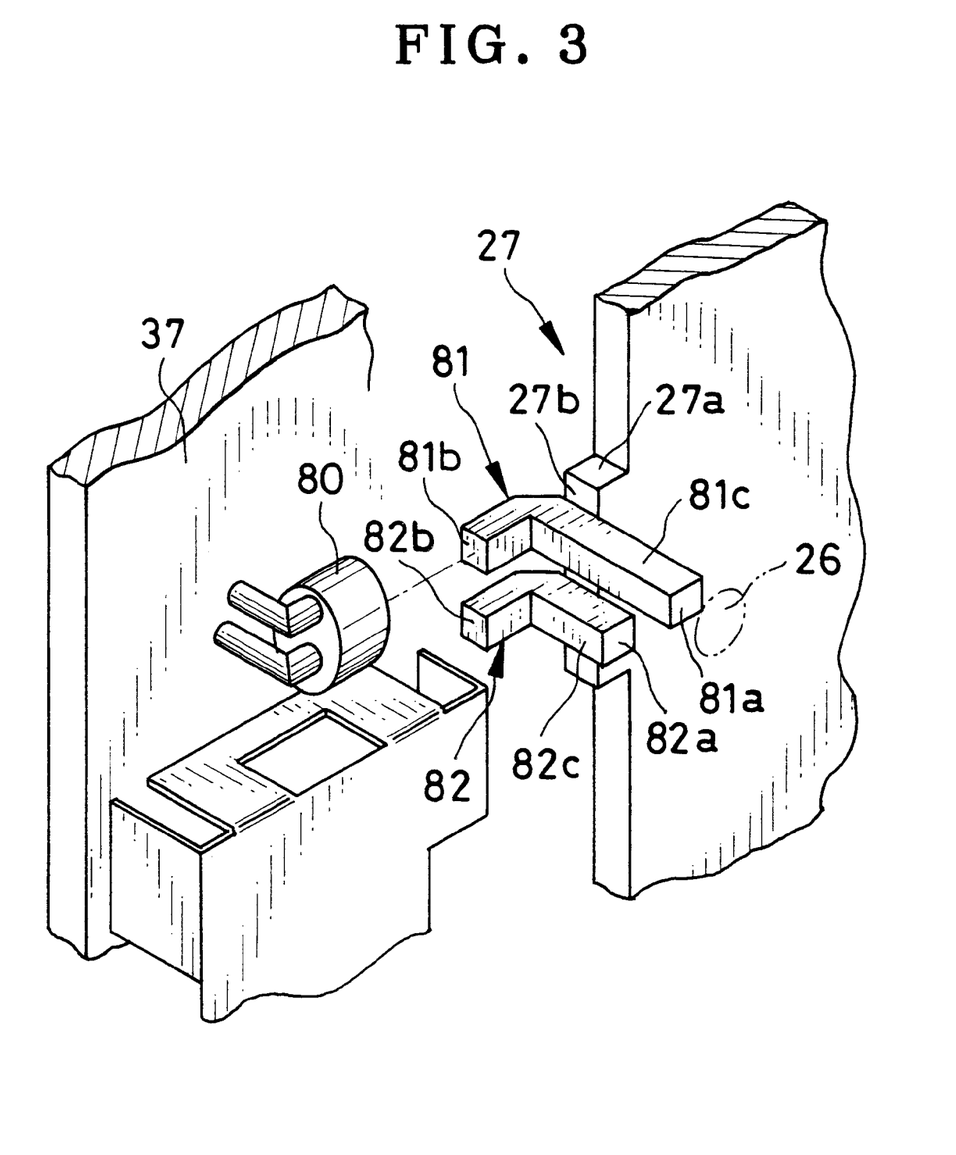
FIG. 3 is a perspective view illustrating a main part of the embodiment of the present invention.

As shown in FIG. 3, the flash charge switch 27 has a projection 27a formed integrally therewith. And a first light guide 81 and a second light guide 82 are placed on an end face 27b of the projection 27a in a row along a direction where the flash charge switch 27 moves. The first light guide 81 and the second light guide 82 are produced from transparent resin or glass, and respectively formed into a L-shape as a whole. The first light guide 81 is used for the daylight photography that the flash device 13 is unused, and the second light guide 82 is used for the flash photography.

The first light guide 81 is constituted of a first light guide main body 81c, an incident end (a light-receiver face) 81a and an emission end 81b. The first light guide main body 81c is attached to the end face 27b. And the incident end 81a receives subject light through the photometric window 26. The subject light passes through an inside of the first light guide main body 81c, and projects from the emission end 81b toward the photo sensor 80. Similarly, the second light guide 82 is constituted of a second light guide main body 82c, an incident end 82a and an emission end 82b. It is noted that a length of the first light guide main body 81c is longer than that of the second light guide main body 82c, so as to have a short distance from the incident end 81a to the photometric window 26 compared with that from the incident end 82a to the photometric window 26.

The first light guide 81 and the second light guide 82 are moved in a vertical direction by the projection 27a in response to the sliding operation of the flash charge switch 27. Namely, the flash charge switch 27 is slid to an upper ON position in the flash photography. In response to the flash charge switch 27, the second light guide 82 is moved to a position between the photometric window 26 and the photo sensor 80. On the other hand, when the flash device 13 is unused in the daylight photography, the flash charge switch 27 is slid to a lower OFF position. In response to the flash charge switch 27, the first light guide 81 is moved to the position between the photometric window 26 and the photo sensor 80.

Figure 4B:
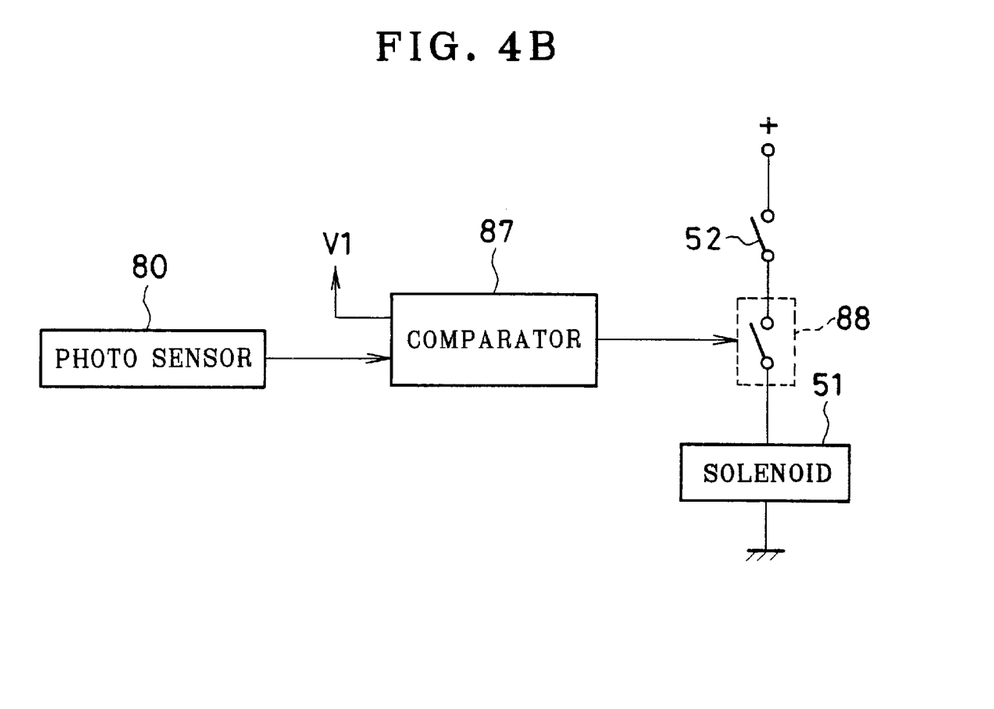
FIG. 4B is a block diagram illustrating a stop aperture control circuit.

In FIG. 4B illustrating the stop control circuit, an output signal of the photo sensor 80 is transmitted to a comparator 87, and then compared to a reference signal V1 that is a reference value of changing the stop apertures. The comparator 87 turns on a switch 88 while the output signal of the photo sensor 80 is above V1. A semiconductor switch like a transistor, a relay switch and the other elements are used for the switch 88. The switch 88 is connected in parallel to the switch 52, which is turned on by depressing the shutter release button 28 halfway. When the shutter release button 28 is depressed halfway while the output signal of the photo sensor 80 is above V1, the solenoid 51 is activated and the stop plate 47 is inserted in the photographic light path 86. By use of the stop plate 47, the size of the stop aperture becomes smaller. It is noted that the photo sensor 80, the switches 52 and 88, and the comparator 87 are mounted on the circuit board 37.

Figure 5:
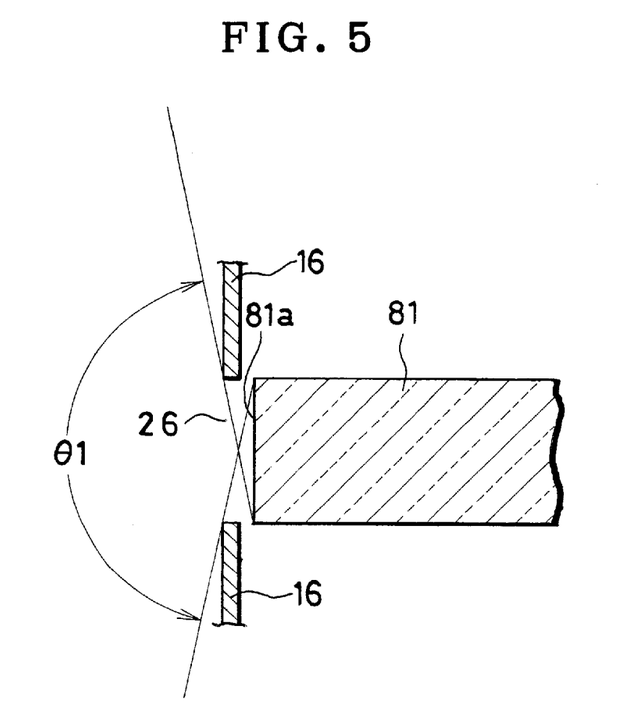
FIG. 5 is a sectional view in the vicinity of a photometric window illustrating a state of choosing a first light guide.
Figure 6:
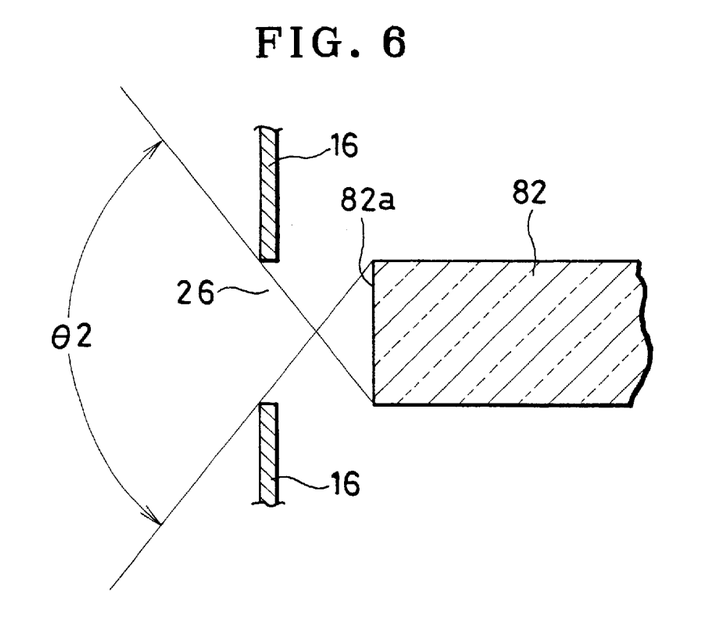
FIG. 6 is a sectional view similar to FIG. 5 illustrating a state of choosing a second light guide.

As shown in FIG. 5, in the daylight photography, the incident end 81a receives the subject light on a position close to the photometric window 26. Thereby, if the first light guide 81 is used, an acceptance angle thereof becomes θ1, thus it is possible to perform averaged brightness measuring for measuring brightness of a whole to the photographic field. And in the flash photography as shown in FIG. 6, the incident end 82a receives the subject light on a position far away from the photometric window 26. Thereby, an acceptance angle of the second light guide 82 becomes θ2, thus it is possible to perform center-weighted measuring for measuring the center of the field particularly. The stop aperture is controlled on the basis of the center-weighted measuring in the flash photography, while the stop aperture is controlled on the basis of the averaged brightness measuring in the daylight photography.

Figure 7:
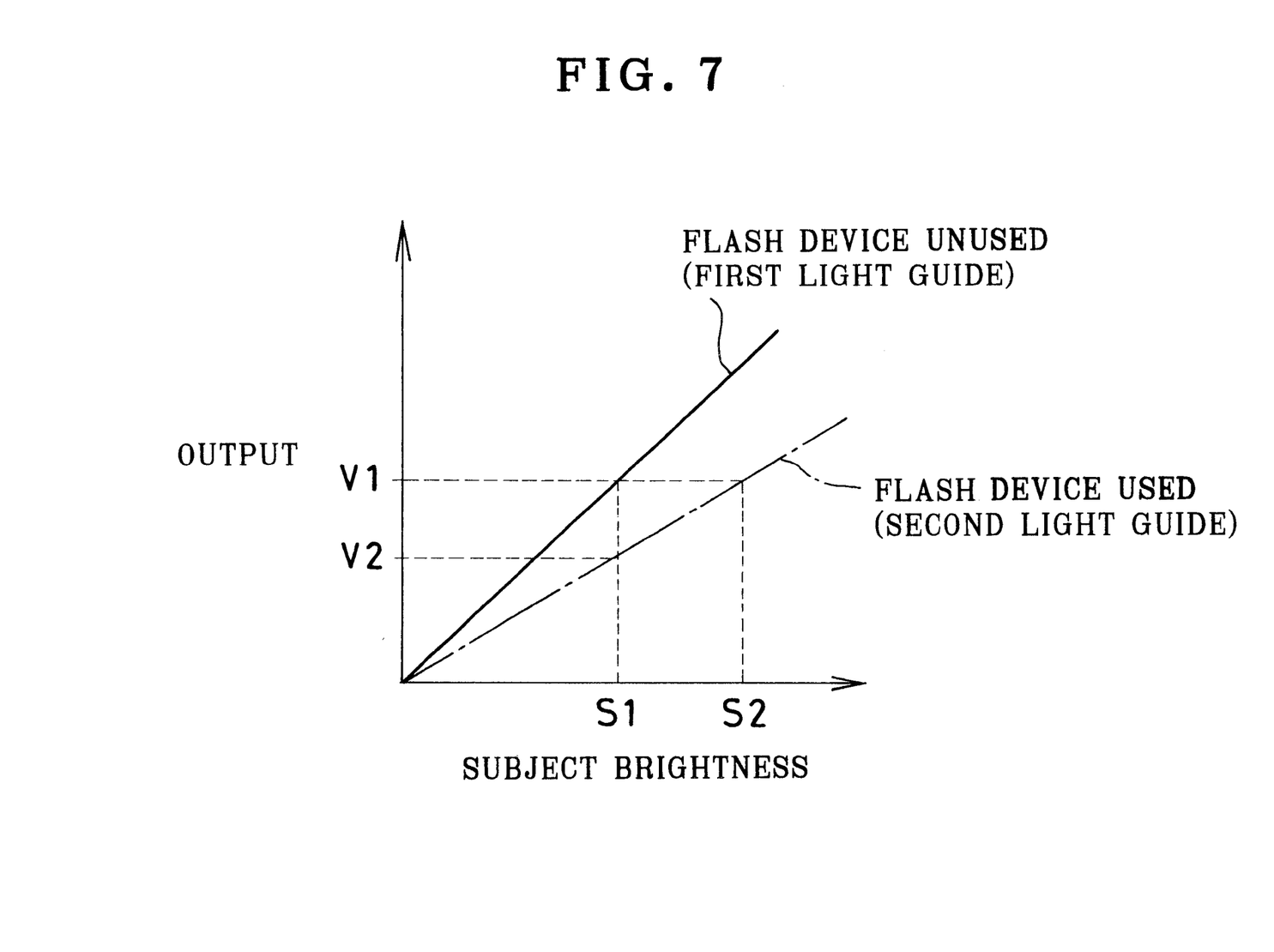
FIG. 7 is a graph showing output of a photo sensor in the course of using each light guide.

FIG. 7 illustrates the output signal of the photo sensor 80. If output of the photo sensor 80 is above V1, the solenoid 51 is activated to change the stop apertures. As the first light guide 81 is used for the daylight photography, brighter light inserts the photo sensor 80. Consequently, a threshold of subject brightness for changing the stop apertures becomes S1. If the subject brightness is above S1, the photographs are taken by use of the small stop aperture 47a.

On the other hand, as the second light guide 82 is used for the flash photography, weak or faint light inserts the photo sensor 80. At that time, the threshold of subject brightness becomes S2 (S2>S1). Therefore, in the flash photography, the output signal of the photo sensor 80 is V2 while the subject brightness is S1, thus the photographs are taken by use of the normal stop aperture.

Figure 8:
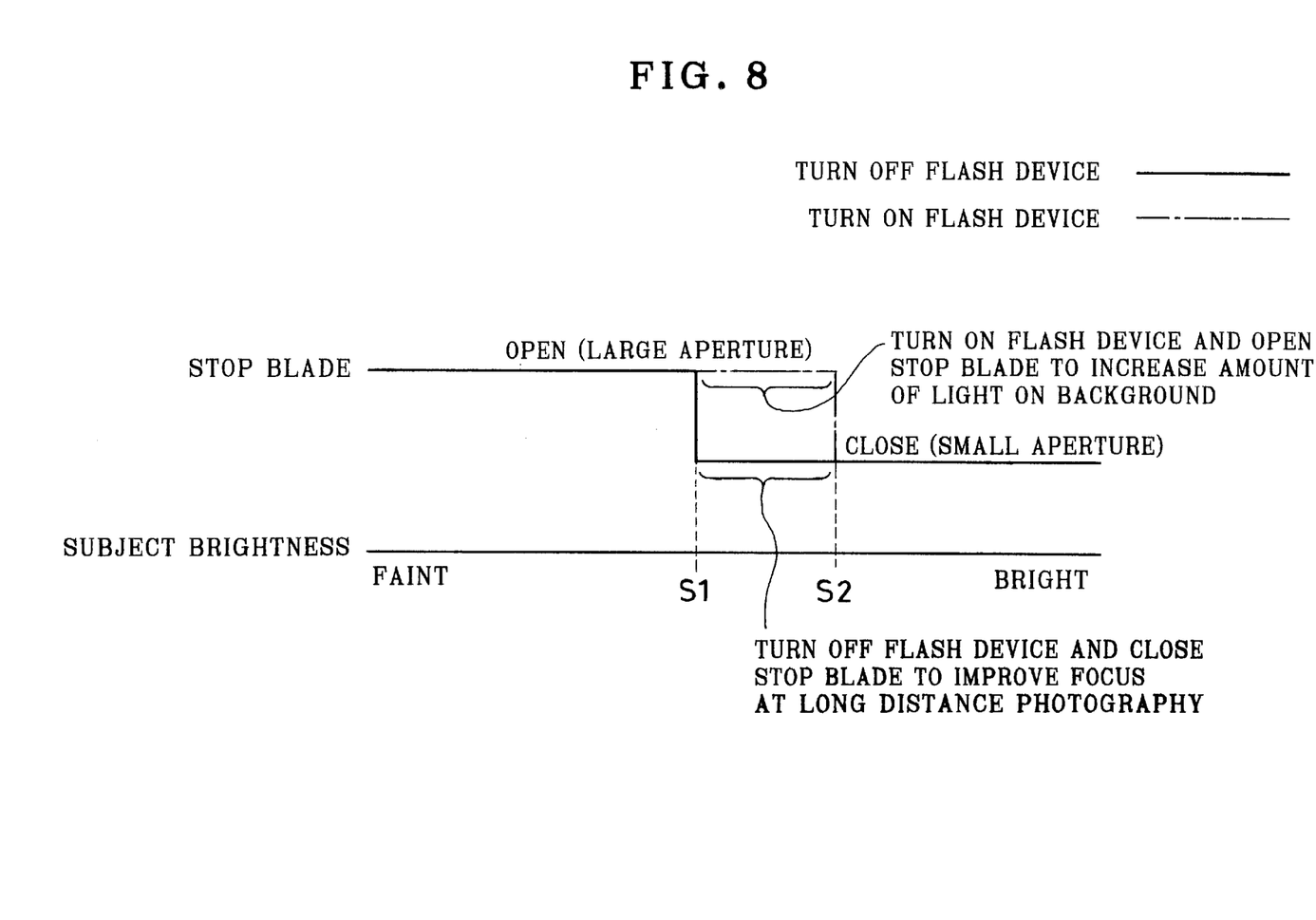
FIG. 8 is a program chart drawing of changing operation of stop apertures.

FIG. 8 depicts a program chart of an automatic exposure type. A continuous line shows a state in which the flash device 13 is not allow to emit light, and a chain line shows a state in which the flash device 13 is allowed to emit light. As shown in FIG. 5, if the flash device 13 is not allowed to emit light, the first light guide 81 is selected so as to perform the averaged brightness measuring. And if the flash device 13 emits light, the second light guide 82 is selected so as to perform the center-weighted measuring.

In the daylight photography, a subject brightness range when the photographs are taken by use of the small stop aperture is larger for a range from S1 to S2 than that when the threshold is S2. And within the range from S1 to S2, a depth of field becomes greater so that a photograph of a background at a long distance has proper sharpness. Moreover, the aperture size is controlled on the basis of the averaged brightness measuring so that the exposure amount of the background at the long distance can be safely appropriate.

In the flash photography, the subject brightness range when the photographs are taken by use of the normal stop aperture is larger for the range from S1 to S2 than that when the threshold is S1. And within the range from S1 to S2, as the photographs are taken by use of the normal stop aperture, the exposure amount of the background is proper without occurring under-exposure. Moreover, the stop aperture is controlled on the basis of the center-weighted measuring so that the exposure amount of the center portion can be appropriate.

The following is about operations of the above embodiment. First of all, the winding wheel 33 is rotated to wind the photo filmstrip 19. When the photo filmstrip 19 is wound for a frame, the shutter mechanism is charged and the film winding mechanism is operated to prevent the rotational movement of the winding wheel 33.

The photographer makes a decision whether the flash photography is to be carried out or not, considering brightness of the subject. If the photographs are taken in such a sunny place as outdoors in fine weather, the daylight photography without using the flash device 13 is selected. At that time, the flash charge switch 27 is slid downwards to turn off the flash device 13. In response to the flash charge switch 27, the first light guide 81 is selected and set in such a position that the incident end 81a thereof is opposed to the photometric window 26.

The first light guide 81 transmits the subject light, which inserts through the photometric window 26, to the photo sensor 80. The photo sensor 80 measures the subject on the basis of the averaged brightness measuring by use of the first light guide 81. If the shutter release button 28 is depressed halfway while the subject brightness is above S1, the solenoid 51 is activated to rotate the stop plate 47 toward the first position and set the small stop aperture 47a on the photographic light path 86.

When the shutter release button 28 is fully depressed, the kick lever 56 kicks the shutter blade 48 to open and close the shutter opening 46a. Photographic light inserting through the taking lens 20 passes through the small stop aperture 47a and the shutter opening 46a, and exposes the photo filmstrip 19. When the photographer stops depressing the shutter release button 28, the solenoid 51 is turned off so that a biasing force of the second spring 61 rotates the stop plate 47 returning to the second position where the stop plate 47 is retired from the photographic light path 86.

However, if the subject brightness is below S1, the switch 88 remains in an OFF state, thus the solenoid 51 is not activated even though the shutter release button 28 is depressed halfway. Therefore, the stop plate 47 is kept in the second position, and the photographs are taken by use of the normal stop aperture, which has a larger size than that of the small stop aperture 47a.

The flash photography is selected for low light scenes such as indoors or outdoors in cloudy weather. At that time, the flash charge switch 27 is slid upwards to turn on the flash device 13, which starts a charge of a main capacitor 34. Then, in response to the operation of the flash charge switch 27, the second light guide 82 is set on a position facing onto the photometric window 26. The photo sensor 80 performs the center-weighted measuring through the second light guide 82.

In the flash photography, after checking completion of the charge by the light guide 25, the shutter release button 28 is operated. If the subject brightness is above S2, the solenoid 51 is activated by depressing the shutter release button 28 halfway to change the normal stop aperture to the small stop aperture 47a. When the shutter release button 28 is fully depressed, the shutter blade 48 is opened and starts moving. In connection with the opening movement of the shutter blade 48, the synchronous switch 36 is turned on. Thereby, the flash device 13 emits light to illuminate the subject.

If the subject brightness is below S2, as the stop plate 47 is retired from the photographic light path 86, the photographs are taken through the normal stop aperture. Also at that time, the flash device 13 emits light connectively with a shutter.

Figure 9:
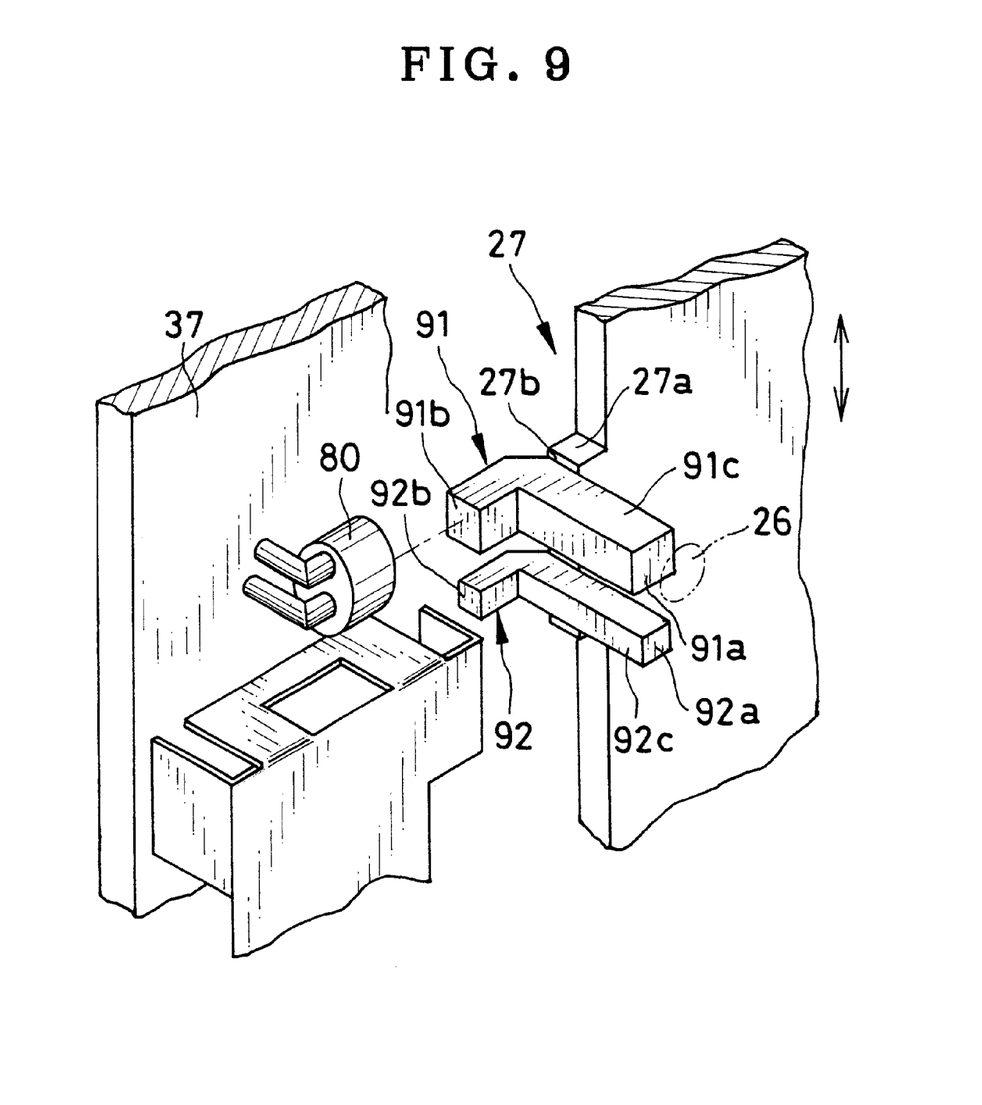
FIG. 9 is a main part of a sectional view illustrating the embodiment of the present invention of using two types of the light guides, which are different from each other in sectional area.

FIG. 9 shows another preferred embodiment of the light guides. In this embodiment, a sectional area of a first light guide 91 is larger than that of a second light guide 92. Either the first light guide 91 or the second light guide 92 is selected in response to the flash charge switch 27. The first light guide 91 is used for the daylight photography, and the second light guide 92 is used for the flash photography.

The first light guide 91 is constituted of a first light guide main body 91c, an incident end 91a and an emission end 91b, and transmits the subject light to the photo sensor 80. Similarly, the second light guide 92 is constituted of a second light guide main body 92c, an incident end 92a and an emission end 92b.

As an area of the incident end 91a is smaller than that of the incident end 92a, if the subject brightness is same in degree, the first light guide 91 transmits brighter light to the photo sensor 80 than the second light guide 92. For that reason, similarly to a chart of FIG. 7, the threshold of the subject brightness in the first light guide 91 is S1, and the threshold thereof in the second light guide 92 is S2.

It is also possible to control amount of light on a photo sensor by arranging a movable ND filter. At that time, one light guide is disposed between a photometric window and the photo sensor. The ND filter is arranged between an incident end of the light guide and the photo sensor, and connected to the flash charge switch 27. In the flash photography, the ND filter is inserted in front of the incident end to reduce the amount of light entering the light guide. Also, a flexible light guide for changing positions of the incident end with reference to the photometric window may be used to increase or reduce the amount of incident light on the light guide.

In the above embodiments, there are two types of the light guides so as to change output of the photo sensor depending on whether a flash device is used or not. Yet when a lens-fitted photo film unit including a wide angle lens and a telephotographic lens is used, it is preferable to change thresholds for changing stop apertures according to the type of the lenses. At that time, two light guides are assigned to each lens, thus four light guides are used all together. One light guide out of four is selected in response to the operation of switching the lens and the operation of the flash charge switch. Besides, a shape of the light guide depends on a position to which the light guide is attached. In short, the light guide can have any suitable shape as long as it is possible to guide subject light being received through the photometric window to the photometric element.

As described heretofore, there are a first embodiment of using a pair of light guides that are different from each other in distance from the photometric window to the incident end; and a second embodiment of using another pair of the light guides that are different from each other in sectional area of the incident end, yet it is possible to use another preferable pair of light guides that are different from each other both in distance and in sectional area. For instance, it is also preferable to use a pair of a first light guide having a short distance from the photometric window to the incident end and a small sectional area; and a second light guide inversely having a long distance from the photometric window to the incident end and a large sectional area. At that time, the first light guide is to be used for the daylight photography, while the second light guide is to be used for the flash photography.

Averaged brightness measuring or center-weighted measuring are performed by changing distances from the photometric window to the incident end, yet it is alternatively possible to perform the averaged brightness measuring or the center-weighted measuring by use of the lens and the like. Although the light guides are not to be integrated with the flash charge switch 27, it is alternatively possible to attach the light guides to any suitable members connectively.

Furthermore, the present invention is used for a lens-fitted photo film unit according to the above description, yet it is alternatively possible to apply the present invention to a camera of the conventional type in which films are exchangeable.

It should also be understood that the foregoing relates to only preferred embodiments of the invention, and that it is intended to cover all changes and modifications of the example of the invention herein chosen for the purposes of the disclosure, which do not constitute departures from the spirit and scope of the invention.

What is claimed is:

1. A camera that includes a photo sensor for measuring subject brightness through a photometric window, a stop change mechanism for changing a normal stop aperture to a small stop aperture that has a smaller size than that of the normal stop aperture while output of the photo sensor is above a predetermined value, a flash charge switch that moves between an ON position and an OFF position, a flash device that emits light synchronized with a shutter mechanism while the flash charge switch is in the ON position, the camera comprising:

a light amount adjustor device for changing amount of light that enters the photo sensor in response to the movement of the flash charge switch, in which the output of the photo sensor has the predetermined value if the subject brightness is S1 while the flash charge switch is in the OFF position; and the output of the photo sensor has the predetermined value if the subject brightness is S2 (S1<S2) while the flash charge switch is in the ON position.

2. A camera as claimed in claim 1, wherein the stop change mechanism has a stop plate that is provided with the small stop aperture and moves between a first position where the stop plate is retired from a photographic light path and a second position where the stop plate is set on the photographic light path, such that the small stop aperture is used on the first position, and the normal stop aperture is used on the second position.

3. A camera as claimed in claim 2, wherein the stop change mechanism includes a comparator comparing the output of the photo sensor to the predetermined value, a first switch switched by the output of the comparator, a second switch turned on by depressing a shutter release button halfway, and an electromagnetic force generator connected in serial to the first switch and the second switch to force the stop plate to move.

4. A camera as claimed in claim 3, wherein the electromagnetic force generator is a solenoid.

5. A camera as claimed in claim 3, further comprising a circuit board on which electric components of the flash device are mounted, wherein the photo sensor, the first switch, the second switch, and the comparator are mounted on the circuit board.

6. A camera as claimed in claim 3, wherein the light amount adjustor device includes at least a first light guide that transmits subject light through the photometric window to the photo sensor while the flash charge switch is in the ON position and a second light guide that transmits the subject light through the photometric window to the photo sensor while the flash charge switch is in the OFF position, the first light guide transmitting brighter light to the photo sensor than the second light guide while the subject brightness is equal.

7. A camera as claimed in claim 6, wherein the first light guide and the second light guide are attached to the flash charge switch.

8. A camera as claimed in claim 7, wherein each of the first light guide and the second light guide is formed into a L-shape and has a square sectional area.

9. A camera as claimed in claim 6, wherein the first light guide has a short distance from an incident end thereof to the photometric window and the second light guide has a long distance from the incident end thereof to the photometric window.

10. A camera as claimed in claim 6, wherein the incident end of the first light guide has a great sectional area and the incident end of the second light guide has a small sectional area.

* * * * *